United States Patent
Vega et al.

(10) Patent No.: US 11,436,883 B2
(45) Date of Patent: Sep. 6, 2022

(54) SECURED TETHERING PROCESS BETWEEN DEVICES

(71) Applicant: HAMPTON PRODUCTS INTERNATIONAL CORPORATION, Foothill Ranch, CA (US)

(72) Inventors: Jose Luis Vega, Plano, TX (US); Michael Krasnicki, Richardson, TX (US); Howard Shen, Mission Viejo, CA (US); Jon Fong Quan, Fountain Valley, CA (US)

(73) Assignee: Hampton Products International Corporation, Foothill Ranch, CA (US)

( * ) Notice: Subject to any disclaimer, the term of this patent is extended or adjusted under 35 U.S.C. 154(b) by 566 days.

(21) Appl. No.: 16/505,398

(22) Filed: Jul. 8, 2019

(65) Prior Publication Data
US 2020/0013246 A1 Jan. 9, 2020

Related U.S. Application Data

(60) Provisional application No. 62/695,405, filed on Jul. 9, 2018.

(51) Int. Cl.
*G07C 9/00* (2020.01)
*H04L 9/08* (2006.01)
*G06F 7/58* (2006.01)
*G06F 3/0488* (2022.01)

(52) U.S. Cl.
CPC ......... *G07C 9/0069* (2013.01); *G06F 3/0488* (2013.01); *G06F 7/58* (2013.01); *H04L 9/0822* (2013.01)

(58) Field of Classification Search
CPC .............. G07C 9/0069; G07C 9/00174; G07C 2009/00793; G07C 2209/02; G06F 3/0488; G06F 7/58; G06F 21/44; H04L 9/0822; H04W 12/0471; H04W 12/50; H04W 12/03; H04M 1/72415
See application file for complete search history.

(56) References Cited

U.S. PATENT DOCUMENTS

| | | | | |
|---|---|---|---|---|
| 2008/0162932 A1* | 7/2008 | Challener | ............... | G06F 21/51 713/168 |
| 2015/0334114 A1* | 11/2015 | Scarlata | .................. | G06F 21/81 713/170 |

* cited by examiner

*Primary Examiner* — Angie Badawi
(74) *Attorney, Agent, or Firm* — Klein, O'Neil & Singh, LLP

(57) ABSTRACT

Methods and systems are provided for pairing electronic devices. One method includes generating a code sequence for pairing an electronic device with an application executed by a processor of a controller, the controller being remote to the electronic device, and the electronic device and the controller interfacing with a server via a network connection. The code sequence includes a configuration mode portion indicating a role for a user of the controller, an invitation sequence having invitation code for the user and a random code portion. The method further includes receiving the code sequence by the electronic device; validating the code sequence by the electronic device using a key data structure; and pairing the electronic device to the controller for enabling the application to monitor and command the electronic device.

20 Claims, 4 Drawing Sheets

| Configuration mode | Invitation Code | | | | Random Code | | | | Checksum |
|---|---|---|---|---|---|---|---|---|---|
| α | XX | A1 | A2 | A3 | A4 | B1 | B2 | B3 | B4 | C1 |
| A | 02 | 2 | 9 | 4 | 7 | 9 | 4 | 7 | 8 | (2+9+4+7+9+4+7+8)=50 mod 10=0 |

α: symbol, letter, or number
XX: 01 is the owner; 02 is the invitee
A1-A4: four digit invitation code
B1-B4: four digit random generated code
C1: addition of digits in invitation code and random generated code mod 10; if remainder not equal to 0.

| Configuration mode | Invitation Code | | | | Random Code | | | | Checksum |
|---|---|---|---|---|---|---|---|---|---|
| α | XX | A1 | A2 | A3 | A4 | B1 | B2 | B3 | B4 | C1 |
| A | 02 | 2 | 9 | 4 | 7 | 9 | 4 | 7 | 8 | (2+9+4+7+9+4+7+8)=50 mod 10=0 |

α: symbol, letter, or number
XX: 01 is the owner; 02 is the invitee
A1-A4: four digit invitation code
B1-B4: four digit random generated code
C1: addition of digits in invitation code and random generated code mod 10; if remainder not equal to 0.

SECURED TETHERING PROCESS BETWEEN DEVICES

CROSS REFERENCE TO RELATED APPLICATION

This application claims priority, under 35 U.S.C. 119(e), from U.S. Provisional Application No. 62/695,405, filed Jul. 9, 2018, the disclosure of which is incorporated herein by reference in its entirety.

FEDERALLY SPONSORED RESEARCH OR DEVELOPMENT

Not applicable

BACKGROUND

The present disclosure pertains to a system and method of forming a wireless data communication tether between electronic devices, such as, for example, a secure data communication tether between a controller and a controlled device.

Common household devices, such as thermostats, door locks, lighting, security cameras, and switches can now be monitored and controlled remotely by a controller device, embodied, for example, in a smartphone, tablet, or computer. These common household devices have evolved to become "smart" home devices, which often include embedded control systems, wireless transceivers, and automation to achieve objectives such as energy savings and improved customization for user comfort and convenience. Often, an application or "app" resides on the controller device and provides an interface for a user to monitor and control the smart home devices.

The conventional approach of allowing a controller to control a smart home device is through authentication, such as, for example, by using a username and password. This authentication process, however, does not prevent unauthorized users from controlling the smart home devices with their own devices after figuring out the username and password of an authorized user.

A more secure approach is a two-factor authentication ("2FA") process, which uses not only the username and the password, but also an additional security code that must be entered before access is granted. For example, an app on a smartphone or the smart home device would transmit an additional multi-digit security code sent via short message service ("SMS") or email after the username and the password have been successfully entered and confirmed. However, this does not prevent an unauthorized user with access to an authorized user's email or smartphone, for example, from accessing the smart home device.

SUMMARY

Broadly, this disclosure relates to a system for remotely controlling an electronic device, the system comprising, in some aspects, a controller having a processor and a memory in which is stored a monitor and command application comprising at least one processor-executable program configured, when executed by the processor, to enable the controller to monitor and command the electronic device wirelessly, wherein the application is operable to generate a registration code for the device. A user input interface is advantageously provided on the device for entering the registration code to pair the controller with the device. In accordance with some embodiments of the disclosure, the electronic device is an electronic deadbolt.

In one embodiment, a method is provided. The method includes generating a code sequence for pairing an electronic device with an application executed by a processor of a controller, the controller being remote to the electronic device, and the electronic device and the controller interfacing with a server via a network connection. The code sequence includes a configuration mode portion indicating a role for a user of the controller, an invitation sequence having invitation code for the user and a random code portion. The method further includes receiving the code sequence by the electronic device; validating the code sequence by the electronic device using a key data structure; and pairing the electronic device to the controller for enabling the application to monitor and command the electronic device.

In yet another embodiment, a non-transitory machine readable medium having stored thereon instructions for performing a method is provided. The machine executable code when executed by at least one machine, causes the machine to: generate a code sequence for pairing an electronic device with an application executed by a controller, the controller being remote to the electronic device, and the electronic device and the controller interfacing with a server via a network connection, where the code sequence includes a configuration mode portion indicating a role for a user of the controller, an invitation sequence having invitation code for the user and a random code portion; receive the code sequence by the electronic device; validate the code sequence by the electronic device using a key data structure; and pair the electronic device to the controller for enabling the application to monitor and command the electronic device.

DETAILED DESCRIPTION

The detailed description set forth below in connection with the appended drawings is intended as a description of the embodiments of a system of multiple devices tethered together in accordance with aspects of the present components, assemblies, and method. It is not intended to represent the only forms in which the present components, assemblies, and method may be constructed or utilized. The description sets forth the features and the steps for constructing and using the embodiments of the present components, assemblies, and method in connection with the illustrated embodiments. It is to be understood, however, that the same or equivalent functions and structures may be accomplished by different embodiments that are also intended to be encompassed within the spirit and scope of the present disclosure.

As denoted elsewhere herein, like element numbers are intended to indicate like or similar elements or features As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1:
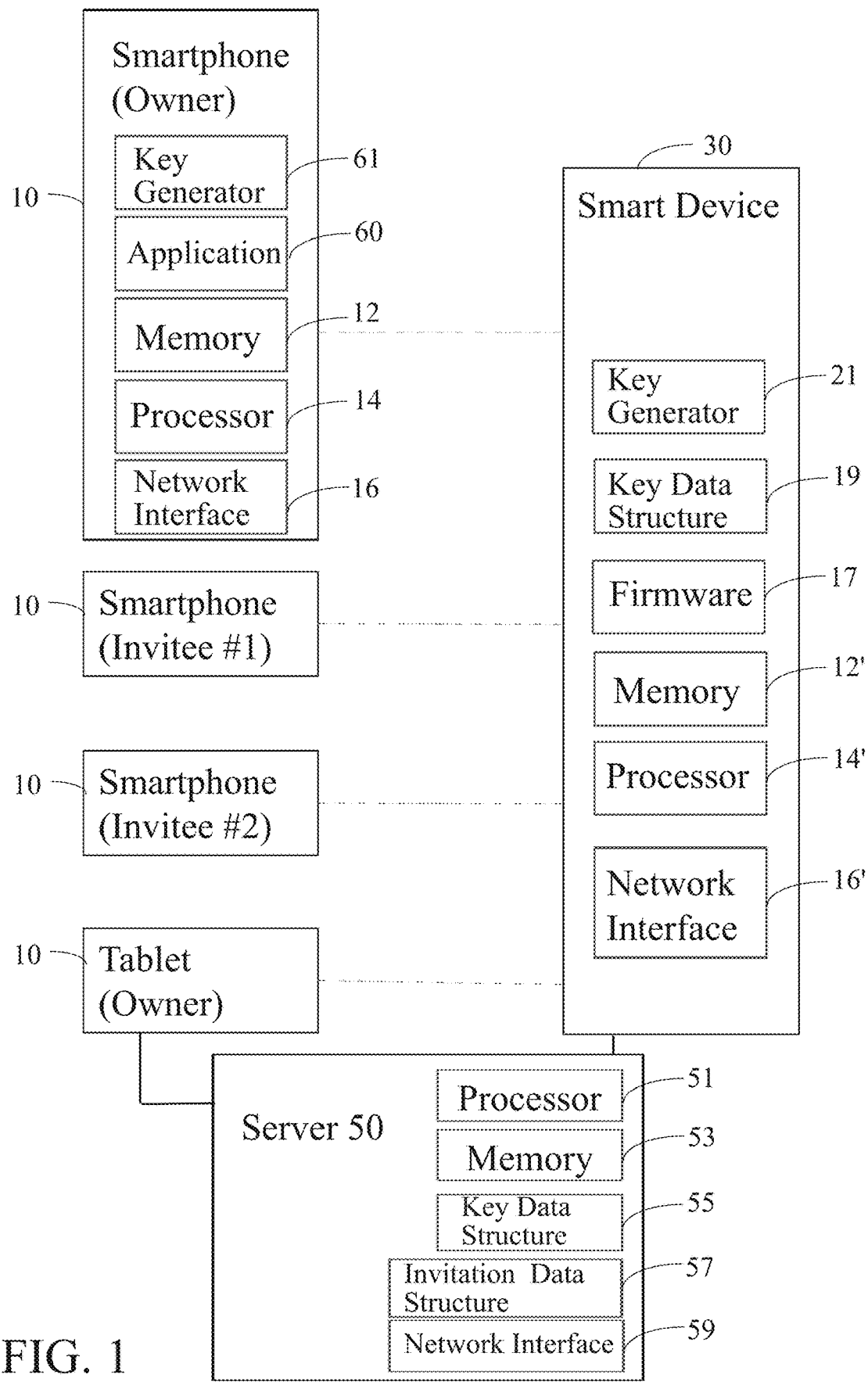
FIG. 1 is a diagrammatic representation of a system comprising a plurality of controllers embodied in smartphones, each of which is tethered to a smart home device.

FIG. 1 illustrates an exemplary embodiment of a system of connected devices comprising a smart device 30 and one or several controllers 10 (e.g., a smartphone, a tablet or any other electronic device), each of which is coupled, paired, or tethered to the smart device 30 (e.g., deadbolt) over a network. After a controller 10 is tethered to the smart device 30, communication between the controller 10 and the smart device 30 can be controlled by at least one server 50, which is also connected to the network. The network may be any type of network, such as a local area network (LAN), a wide area network (WAN) such as the Internet, a cellular network, a satellite network, or a combination thereof. The server 50 may be any kind of server or a cluster of servers, such as Web or cloud servers, application servers, backend servers, or a combination thereof.

In one aspect, server 50 may be part of a cloud architecture that enables cloud-based computing. "Cloud based computing" means computing capability that provides an abstraction between a computing resource and its underlying technical architecture (e.g., servers, storage, networks), enabling convenient, on-demand network access to a shared pool of configurable computing resources that can be rapidly provisioned. The term "cloud" is intended to refer to a network, for example, the Internet, and cloud-based computing allows shared resources, for example, software and information to be available, on-demand, like a public utility. Typically, a cloud-based computing system delivers business applications online that are accessed from another web service or software like a web browser, while the software and data are stored remotely on servers. The cloud computing architecture uses a layered approach for providing application services. A first layer is an application layer that is executed at client computers. After the application layer is a cloud platform and cloud infrastructure, followed by a "server" layer that includes hardware and computer software designed for cloud-specific services. In one aspect, server 50 of FIG. 1 is part of the server layer and in some instances may be broadly be referred to as the "cloud" throughout this specification.

In one aspect, server 50 includes at least one central processor 51 and server memory 53, coupled to a bus system (not shown). The bus system is an abstraction that represents any one or more separate physical buses and/or point-to-point connections, connected by appropriate bridges, adapters and/or controllers. The bus system therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire"). The central processor 51 is the central processing unit (CPU) of the server 50 and, thus, controls its overall operation. In certain aspects, the central processor 51 accomplishes this by executing programmable instructions stored in the server memory 53. The central processor 51 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The server memory 53 represents any form of random access memory (RAM), read-only memory (ROM), flash memory, or the like, or a combination of such devices. The server memory 53 includes the main memory of the server 50 and stores instructions to implement techniques introduced herein and described below in detail. The server memory 53 also stores a key data structure 55 (or key table 55) and an invitation data structure (or invitation table) 57, described below in detail. The key data structure 55 may store structured or unstructured information.

The server 50 may also include one or more internal mass storage devices (not shown) that may be or may include any conventional medium for storing data in a non-volatile manner, such as one or more magnetic or optical based disks or any other storage media. The server 50 further includes a network interface 59 (or network adapter 59) that provides the server 50 with the ability to communicate with remote devices (e.g., controllers 10 and smart device 30) over a network and may be, for example, an Ethernet adapter, or the like. The server 50 may also include one or more input/output (I/O) devices (not shown), for example, a display device, a keyboard, a mouse, etc., details of which are not germane to the various aspects of the present disclosure.

In the illustrated embodiment, the controller 10 can be a smartphone or a tablet, and the smart device 30 can be a smart home device, such as a battery powered electronic deadbolt. Although the smartphone and the electronic deadbolt will be described in this specification, the principles, functions, and interactions between the smartphone and the electronic deadbolt could apply, respectively, to any controller type and smart device type, and may be used interchangeably. Moreover, although a single smart device 30 is shown, multiple smart devices 30 can be coupled to each other and or/coupled to at least one controller 10 over a network.

A user of a controller 10 (e.g., smartphone) in a system of connected devices can monitor and control a smart device (e.g., deadbolt) via one or more programs, residing in a memory 12 of the controller 10, that are executable by one or more processors 14 of the controller. (For simplicity, only one of the controllers 10 depicted in FIG. 1 is shown with a memory 12 and a processor 14; some or all of the other controllers 10 may be similarly configured.) In one embodiment, the processor 14 of each controller 10 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The controller memory 12 represents any form of random access memory (RAM), read-only memory (ROM), flash memory, or the like, or a combination of such devices.

In one embodiment, the program comprises program instructions stored in the memory 12 of the controller. The programs may also include program instructions to pair or tether the controller 10 to the smart device 30, add controllers to the smart device, and/or remove ("untether") controllers from the smart device. The programs can be combined into a single control application ("app") 60 installed at the controller memory 12. As an example, an app 60 for an electronic deadbolt 30 can be installed into a smartphone 10 to set up the installation and pairing of the smartphone to the deadbolt, add and remove users for the deadbolt, and allow a user to monitor and control the deadbolt through the app. As an example, app 60 may be made available for download and installation via a public repository such as that maintained respectively under the trademark GOOGLE PLAY by Google, Inc. and/or the APP STORE maintained by Apple Inc. In one embodiment, the controller 10 executes a controller key generator 61 (e.g., a random key generator and shown as key generator 61)) to generate unique keys, as described below in detail. In other embodiments, the application 60 includes the controller key generator 61.

In one embodiment, controller 10 includes a network interface 16 to communicate with different devices, including Wi-Fi interface, Bluetooth interface, NFC (Near Field Communication) interface and others. The various examples described herein are not limited to any specific interface.

In the embodiment shown in FIG. 1, the smart device 30 may optionally be configured with device memory 12' storing a computer program comprising instructions to be executed by a device processor 14' to perform certain functions relating to, for example, signaling the controller 10 or providing a status indication that may be viewed or heard by a user. In one embodiment, the device processor 14' may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The device memory 12' represents any form of random access memory (RAM), read-only memory (ROM), flash memory, or the like, or a combination of such devices.

In one embodiment, the smart device 30 executes firmware instructions 17 out of the device memory 12' to control the overall operations of the smart device 30. The smart device 30 also executes a device key generator 21 (shown as key generator 21) (e.g., a random key generator) that is described below in detail. As an example, the device key generator 21 may be integrated with firmware 17. A key data structure (also referred to as a key table) 19 is maintained at the smart device 30 for enabling the various process blocks described below. The key data structure 19 may store structured or unstructured data that can be searched by the device processor 14'.

In one embodiment, the smart device 30 includes a network interface 16' to communicate with other devices. Examples of currently available network interfaces include a Wi-Fi interface, a Bluetooth interface, an NFC (Near Field Communication) interface, and others. The various examples described herein are not limited to any specific interface.

Figure 2:
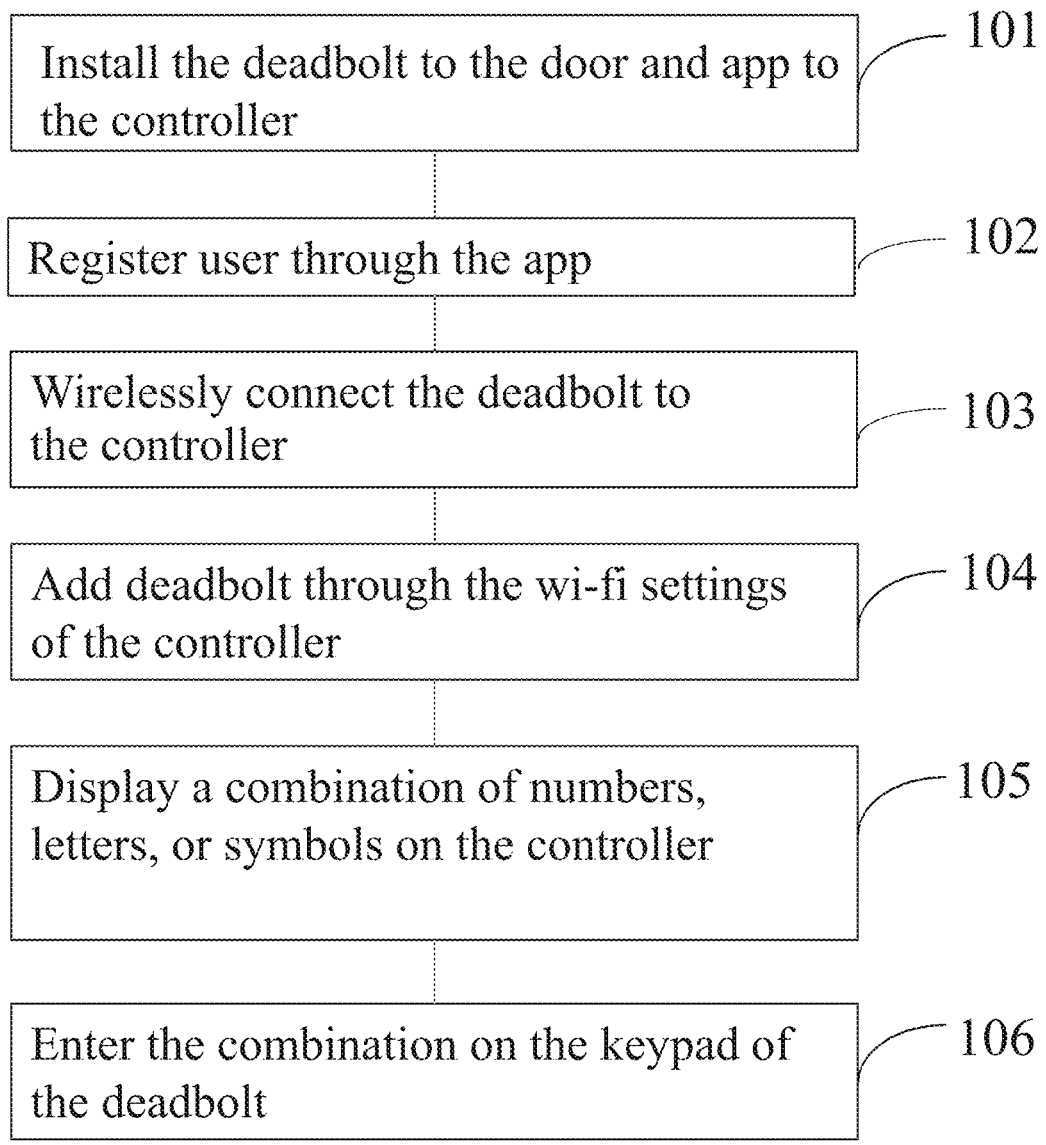
FIG. 2 is a flowchart illustrating an embodiment of a method for pairing a smartphone to a smart home device, e.g., a smart deadbolt for a door.

With reference to FIG. 2, the process to pair or tether the controller 10 to the device 30 may proceed as follows: If the device 30 is, for example, an electronic deadbolt, the process begins by installing the electronic deadbolt in a door (not shown), and installing the control app 60 (FIG. 1) on a controller 10, such as a smartphone (Step 101). (If the smart device 30 is another household device, e.g., an appliance, this step may either be omitted or modified as appropriate.) The app 60, if not already present on the controller 10, can be retrieved through an app store for a particular operating system (e.g., Android™ and iOS®) on the control device 10, or from a website, or any other system of transfer. User registration can be performed through the app 60 (Step 102), after which, the device 30 can be wirelessly connected to the controller 10 (Step 103). The device 10 can now be added through the wi-fi settings of the controller 10 (Step 104). That is the app 60 can be used to connect the device 30 to the server 50 or network of servers hosted on the Internet (e.g., the cloud) to store, manage, and process data. The deadbolt can connect to the cloud via a network interface 16' that may include wi-fi through a wi-fi router, or other wired or wireless technologies, including Bluetooth®. In this example, the deadbolt may be a battery-powered, app-enabled "smart" deadbolt that is configured to connect wirelessly to the cloud, so that the deadbolt can be remotely monitored and controlled through the app 60 on the smartphone.

Figures 3, 4:
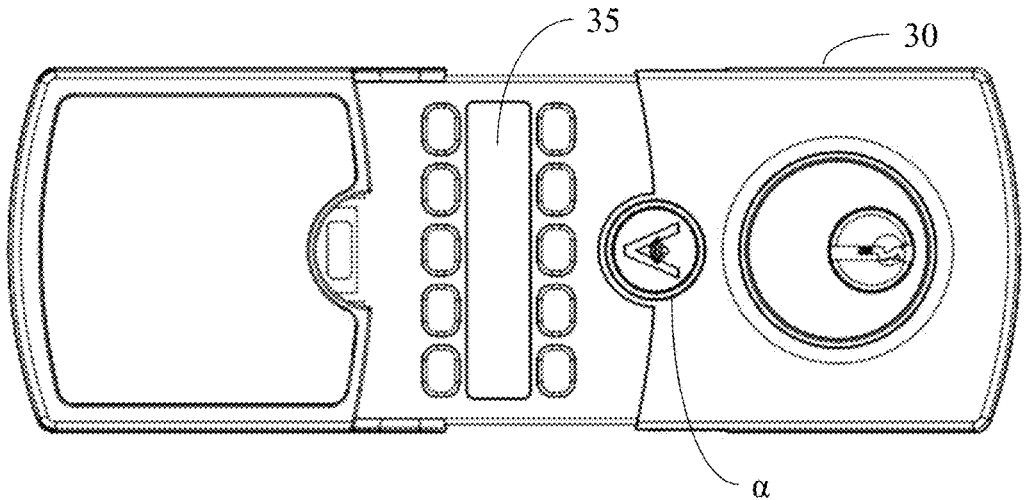
FIG. 3 is a table showing an example of a tethering invitation sequence in accordance with embodiments of the disclosure.
FIG. 4 is simplified plan view of a smart home device embodied as a deadbolt.

An exemplary "smart" electronic deadbolt 30, as shown in FIG. 4, advantageously has a keypad 35 that includes a plurality of alphanumeric (and, optionally, symbolic) keys. The deadbolt 30 is battery-powered, and thus includes a compartment (not show) with suitable terminals (not shown) for housing a battery (not shown). The deadbolt 30 can be placed into a pairing mode by, for example, pressing one or more (preferably two) designated keys (simultaneously or sequentially) on the deadbolt keypad 35 during or after installation of a battery in the battery compartment of the deadbolt 30. Other techniques for initiating the pairing mode, as will suggest themselves to those skilled in the pertinent arts, may be suitable. Once in the pairing mode, the deadbolt 30 enter a discovery stage to allow the controller 10 (hereinafter referred to, for convenience, as an exemplary smartphone) to discover and pair with the deadbolt as discussed below.

As discussed above, the smartphone 10 (i.e. the controller 10) can be connected to the cloud through the app 60. A user is registered using the app 60 and a connection is established between the smartphone and the cloud. After registering the user through the app 60 and establishing the connection between the smartphone and the cloud, the deadbolt is also connected to the cloud through the app, and thereafter, the smartphone can be paired to the deadbolt. The app may present to a user an option on a display screen (not shown) of the smartphone to add the deadbolt through appropriate wi-fi settings (Step 104). Once selected, the app 60 will then ask the user to select the deadbolt as the device to be controlled. That is, the user can select the deadbolt by selecting the wi-fi network corresponding to the deadbolt. The wi-fi functionality on the deadbolt is then automatically configured to connect to the cloud. After the deadbolt is connected to the cloud, a key pair exchange begins by displaying a combination of numbers, letters, or symbols on the display of the smartphone (Step 105) for the user to enter on the keypad 35 or other user interface of the deadbolt (Step 106). This combination is a pairing key combination, which can be generated by the app 60 (or the controller key generator 61), the deadbolt (e.g. the device key generator 21), or by both the app and the deadbolt. After the pairing key combination is entered, the smartphone becomes paired with the deadbolt, and a name for the deadbolt can be entered/assigned.

The pairing key combination for the owner or administrator can start with the app reading a key table 19 stored in the memory 12' of the deadbolt to find an available slot. The app sends an invitation code to the deadbolt corresponding to the available slot. For the owner, first administrator, or first user of the deadbolt, the invitation code would be a predetermined alphanumeric code, such as, for example, "0001". For added users, including additional administrators, the invitation code may be a randomly generated code, as further discussed below. The app may then send a signed command, which can be an "ADD KEY" command, to the deadbolt, which may advantageously be received and processed by the firmware 17 executed by the deadbolt processor 14'. The command can be in the form of the invitation sequence provided in FIG. 3 and detailed below. The firmware 17 parses the sender ID, decrypts the command (e.g. when the command is encrypted) with a public key corresponding to the sender ID (and signed command), and verifies whether the sender ID is included in the key table 19 and designates the role associated with the sender ID (e.g., owner/administrator, other user). If the sender/user is identified as, for example, the administrator, a new key unique to the administrator may be generated. Commands sent by the administrator to the deadbolt can now be encrypted with this key.

Additional users can be added, as follows: First, a new user will receive an invitation message from the administrator/owner by email or other electronic means (e.g., text message). For example, the new user would receive an invitation message by email and/or text message to add the app, if not already installed, onto a smartphone or other device of the new user that would function as a controller 10. After the app is installed and opened, the new user can act on the invitation message through the app to start the pairing process between the controller of the new user and the deadbolt. The registration screen of the controller device may then present a configuration mode sequence, which may be a sequence of alphanumeric characters and (optionally) symbols generated by both the app and the deadbolt using the controller key generator 61 and the device key generator 21, respectively. The app may then ask the new user to enter, on the keypad or other user interface of the controller, the configuration mode sequence, an invitation code sequence, a random code sequence generated by the deadbolt concatenated with the invitation code, and a checksum digit to avoid mistaken data transmission or error, for example, as shown in FIG. 3 and discussed below. Any of the aforementioned codes can comprise one or more symbols, letters, and/or numbers.

FIG. 3 illustrates a code sequence comprising the configuration mode followed by the invitation code sequence, the random code sequence, and the checksum digit. The sequences of alphanumeric characters and (optionally) symbols can be entered, for example, by pressing designated keys on the keypad 35 of the deadbolt 30. An exemplary configuration mode is shown comprising an initial symbol or letter followed by two digits XX, which can be, for example, either be 01 corresponding to the owner, or 02 corresponding to an invitee user. An initial symbol can be entered by pressing separate button α located on the deadbolt, or by pressing a designated alphanumeric key (e.g., "A") on the keypad 35. The invitation code may be a first multi-digit sequence (e.g., a sequence of four digits labeled A1-A4 in FIG. 3) sent by the owner or current user of the deadbolt. The random code may be a second multi-digit sequence (e.g., a sequence of four digits labeled B1-B4 in FIG. 3), which is generated by the app 60 of the new user, but it could conceivably be generated by the server 50 or by the deadbolt processor 14' executing the device key generator 21. The checksum C1 is the sum total of the digits of the invitation code and the randomly-generated generated code divided by a number such as 10. If the numbers are correct, a remainder of 0 results, and the entry of the code sequences will be accepted.

The new user will enter the invitation sequences in the keypad 35 of the deadbolt. The deadbolt firmware 17 will advantageously confirm that the invitation sequences were received and will pick up the corresponding key ID. The corresponding key ID is the first two symbols of the invitation sequence. The deadbolt and the app will generate a key, e.g. a 128-bit key, 192-bit key, a 256-bit key, complying with the AES standard (Advanced Encryption Standard) or any other key type, which can include the code sequences sent in response to the invitation. The firmware 17 of the deadbolt processor 14' will generate a new entry on a key table 19. The firmware 17 will instruct the server 50 to remove an invitation from the invitation table 57 that stores a list of incomplete invitations, i.e., invitations that have not been accepted and paired. A complete invitation means that it is accepted and paired, after which it is removed from the invitation table 57 and updates the last command received properly. The app will securely store the new generated key in the key tables 55 and 19. The firmware 17 will update the key table 19 status, so that the app and firmware can share a key that can be used to encrypt commands sent to the deadbolt. Thus, each smartphone or controller can be uniquely tethered to the deadbolt or controlled device.

Another method of pairing the smartphone to a deadbolt installed in a door comprises connecting the deadbolt to the cloud through wi-fi or other wireless means, including Bluetooth®. After the app verifies the deadbolt is connected to the cloud, the deadbolt may then generate (e.g. using the device key generator 21) a first authentication code comprising a first sequence of letters, numbers, or symbols (e.g., 5-digit code), (e.g., with the app 60 or the controller key generator 61), generating a second authentication code comprising a second sequence of letters, numbers, or symbols (e.g., 5-digit code) to create a combined (e.g., 10-digit) authentication code that is displayed for the user to enter on the user interface or keypad 35 of the deadbolt. The deadbolt may then verify that the combined authentication code is a key that the deadbolt and app have generated, which can then be used to generate the necessary encryption key for the smartphone-deadbolt pair. The smartphone now becomes an authorized device, which can then be used not only to monitor and control the deadbolt, but also to add and remove users. To add a new user, the owner or administrator, using an authorized controller device, creates an e-key and sends an invitation message to another user on another controller device. The new user then accepts the invitation and adds the deadbolt to the new user's account, which will then trigger the deadbolt to generate a first code to send to the app of the new user to generate the second—5 digit code, which can then be entered on the keypad of the deadbolt.

Figure 5:
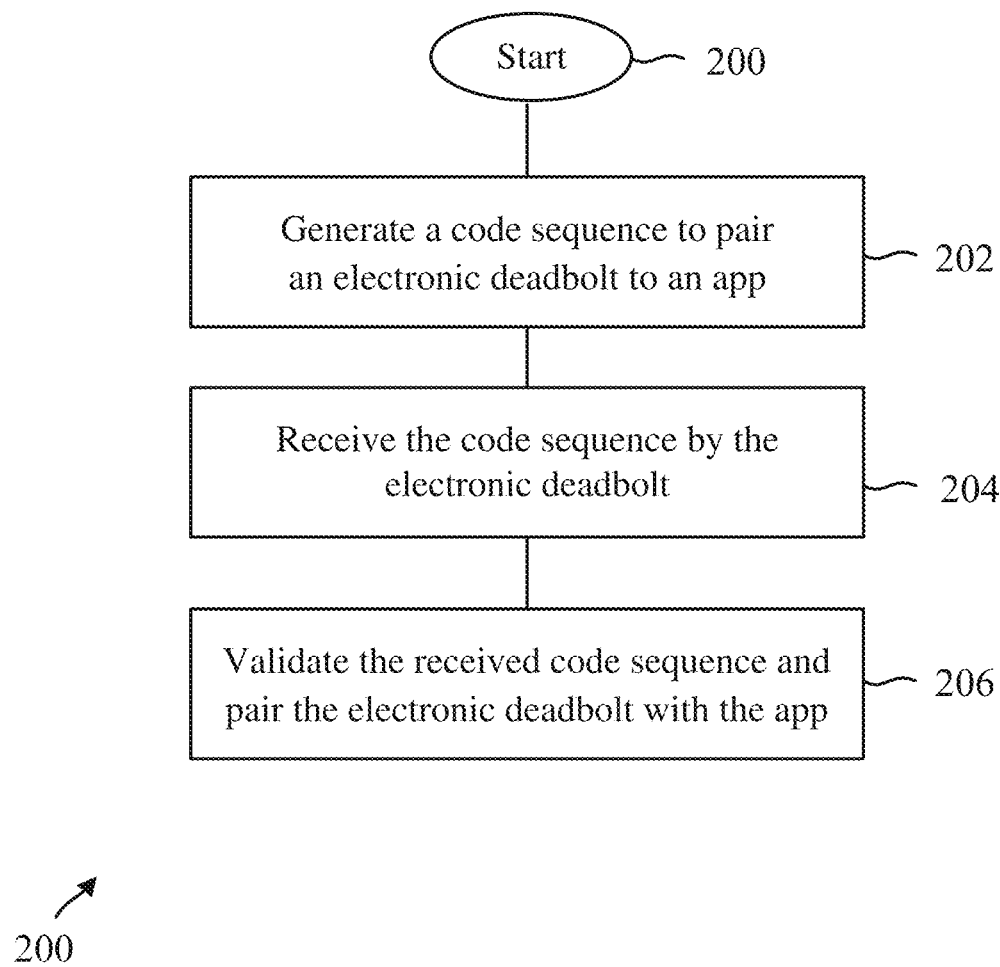
FIG. 5, in one embodiment, illustrates another example of pairing a smart deadbolt to a controller.

FIG. 5 shows an example of a process 200 for pairing the electronic device 30 (e.g. an electronic deadbolt) with the controller 10, according to one embodiment. The process begins in block 200 when the electronic device 30 and the controller 10 have been initialized. Application 60 is operational and connected to the server 50. The electronic device 30 is also initialized and connected to the server 50.

In block 202, a code sequence is generated for pairing the electronic device 30 with application 60. As described above with respect to FIG. 3, the code sequence may include a configuration mode portion indicating a role for a user of the controller 10, an invitation sequence having invitation code for the user and a random code portion. The random code portion may be generated by server 50 and provided to application 60. In another example, the application 60 may generate the code sequence using information stored by the server 50 and the controller 10. In block 204, the electronic device 30 receives the code sequence, e.g. by a user interface. Thereafter, the electronic device 30, validates using a key data structure 19 (or 55); and pairs the electronic device 30 to the controller 10 for enabling the application 60 to monitor and command the electronic device 30.

Hi-Lo Energy Toggle from App

The controller, through the app, may also be used to manage the energy used by the deadbolt. In one embodiment, the app may be able to toggle energy usage or power consumption of the deadbolt between normal and energy savings modes, low and high power savings mode, or different energy states. Thus, the user would have the option to conserve the battery life of the deadbolt. The app may also be programmed to automatically switch from a normal power mode with normal ("high") power consumption, to a power savings mode with lower ("low") power consumption when the battery level falls below a predetermined percentage or level, such as below 10% of total battery life or charge level, or based on activity level, programmed intervals, or usage. In a normal mode, all the features of the deadbolt may be functional and operational. In the power savings mode, some features of the deadbolt may not be functional or operational. Moreover, in the power savings mode, additional features may be unlocked to conserve battery energy, such as a nighttime power-saving mode. This feature may also be available in the normal mode.

Night Mode Battery Savings from App

The nighttime power-saving mode allows the user to select the times the deadbolt turns its wi-fi function on and off to save power. With wi-fi off, only e-codes or a physical key may be used to operate the deadbolt. This feature considers the likelihood the deadbolt will be operated by the owner or other users during hours when members of the household are typically asleep. This also prevents unauthorized users from gaining access or hacking the deadbolt during the selected nighttime hours. When the deadbolt is in the nighttime power-saving mode, the deadbolt is awakened when a button or a key of the keypad is pressed, the deadbolt is moved from locked to unlocked or vice versa, the battery is removed or replaced, or any state change is detected, e.g., with an interrupt to the controller processor 14. When the deadbolt is awakened from the nighttime power-saving mode, the wi-fi of the deadbolt is turned back on momentarily for a predetermined amount of time (e.g., five minutes). The predetermined amount of time may be controlled by a timer (not shown) operatively associated with the deadbolt processor 14'. After the predetermined amount of time has elapsed, the wi-fi is turned back off, and the deadbolt returns to the nighttime power saving mode. Because the wi-fi is turned back on during this period, the user can be alerted of a disturbance to the deadbolt during the nighttime power saving mode.

Although limited embodiments of the system and methods of pairing a controller to a smart device have been specifically described and illustrated herein, many modifications and variations will be apparent to those skilled in the art. Furthermore, it is understood and contemplated that features specifically discussed for one embodiment may be adopted for inclusion with another embodiment when appropriate. Accordingly, it is to be understood that the pairing system, its components, and related methods constructed according to principles of the disclosed devices and methods may be embodied other than as specifically described herein. The disclosure is also defined in the following claims.

What is claimed is:

1. A method, comprising:
generating a code sequence for pairing an electronic device with an application executed by a processor of a controller, the controller being remote to the electronic device, and the electronic device and the controller interfacing with a server via a network connection, the server maintaining an invitation data structure to track any pending invitations sent by the controller to one or more users to interface with the electronic device;
wherein the code sequence includes a configuration mode portion indicating a role for a user of the controller, an invitation sequence having invitation code for the user, a random code portion and a checksum based on the invitation code and the random code portion;
receiving the code sequence by the electronic device;
validating the code sequence by the electronic device by comparing at least a portion of the code sequence with information stored in a key data structure and verifying the checksum; and
in response to successful validation, pairing the electronic device to the controller for enabling the application to monitor and command the electronic device, and the electronic device adding an entry corresponding to the user in the key data structure indicating a user role for interfacing with the electronic device, based on the invitation code, and the electronic device instructing the server to remove an entry associated with the invitation code at the invitation data structure.

2. The method of claim 1, wherein the server generates the random code portion of the code sequence.

3. The method of claim 1, wherein the electronic device is an electronic deadbolt.

4. The method of claim 3, wherein the electronic deadbolt validates the code sequence using at least a portion of the key data structure stored at a memory device of the electronic deadbolt.

5. The method of claim 3, wherein the electronic deadbolt receives the code sequence via a user interface.

6. The method of claim 3, wherein the electronic deadbolt generates a unique key in response to the code sequence.

7. The method of claim 6, wherein the unique key is used to encrypt communication between the application and the electronic deadbolt.

8. A non-transitory machine readable medium having stored thereon instructions for performing a method comprising machine executable code which when executed by at least one machine, causes the machine to:
generate a code sequence for pairing an electronic device with an application executed by a controller, the controller being remote to the electronic device, and the electronic device and the controller interfacing with a server via a network connection, the server maintaining an invitation data structure to track any pending invitations sent by the controller to one or more users to interface with the electronic device;

wherein the code sequence includes a configuration mode portion indicating a role for a user of the controller, an invitation sequence having invitation code for the user a random code portion and a checksum based on the invitation code and the random code portion;

receive the code sequence by the electronic device;

validate the code sequence by the electronic device by comparing at least a portion of the code sequence with information stored in a key data structure and verifying the checksum; and in response to successful validation, pair the electronic device to the controller for enabling the application to monitor and command the electronic device, and the electronic device adding an entry corresponding to the user in the key data structure indicating a user role for interfacing with the electronic device, based on the invitation code, and the electronic device instructing the server to remove an entry associated with the invitation code at the invitation data structure.

9. The non-transitory machine readable medium of claim 8, wherein the server generates the random code portion of the code sequence.

10. The non-transitory machine readable medium of claim 8, wherein the electronic device is an electronic deadbolt.

11. The non-transitory machine readable medium of claim 10, wherein the electronic deadbolt validates the code sequence using at least a portion of the key data structure stored at a memory device of the electronic deadbolt.

12. The non-transitory machine readable medium of claim 10, wherein the electronic deadbolt receives the code sequence via a user interface.

13. The non-transitory machine readable medium of claim 10, wherein the electronic deadbolt generates a unique key in response to the code sequence.

14. The non-transitory machine readable medium of claim 13, wherein the unique key is used to encrypt communication between the application and the electronic deadbolt.

15. A system for remotely controlling an electronic device, the system comprising:

a controller comprising a processor and a memory in which is stored a monitor and command application comprising a processor-executable program, which when executed by the processor operates the controller to monitor and command the electronic device wirelessly, the electronic device and the controller interfacing with a server via a network connection, the server maintaining an invitation data structure to track any pending invitations sent by the controller to one or more users to interface with the electronic device;

wherein the application generates a registration code for the electronic device that includes a configuration mode portion indicating a role for a user of the controller, an invitation sequence having invitation code for the user and a random code portion and a checksum based on the invitation code and the random code portion; and a user input interface on the electronic device for entering the registration code to pair the controller with the device upon successful validation of the entered registration code by comparing the entered registration code with at least a portion of information stored in a key data structure and verifying the checksum; wherein upon successful validation the electronic device adds an entry corresponding to the user in the key data structure indicating a user role for interfacing with the electronic device, based on the invitation code, and the electronic device instructs the server to remove an entry associated with the invitation code at the invitation data structure.

16. The system of claim 15, wherein the electronic device is an electronic deadbolt.

17. The system of claim 15, wherein the user input interface comprises a keyboard.

18. The system of claim 15, wherein the controller is embodied in one or more of a smartphone, a smart tablet, and a portable computer.

19. The system of claim 15, wherein the electronic deadbolt validates the registration code using at least the portion of the key data structure stored at a memory device of the electronic deadbolt.

20. The system of claim 15, wherein the electronic deadbolt generates a unique key in response to the code sequence and the unique key is used encrypt communication between the application and the electronic deadbolt.

* * * * *